UNITED STATES PATENT OFFICE.

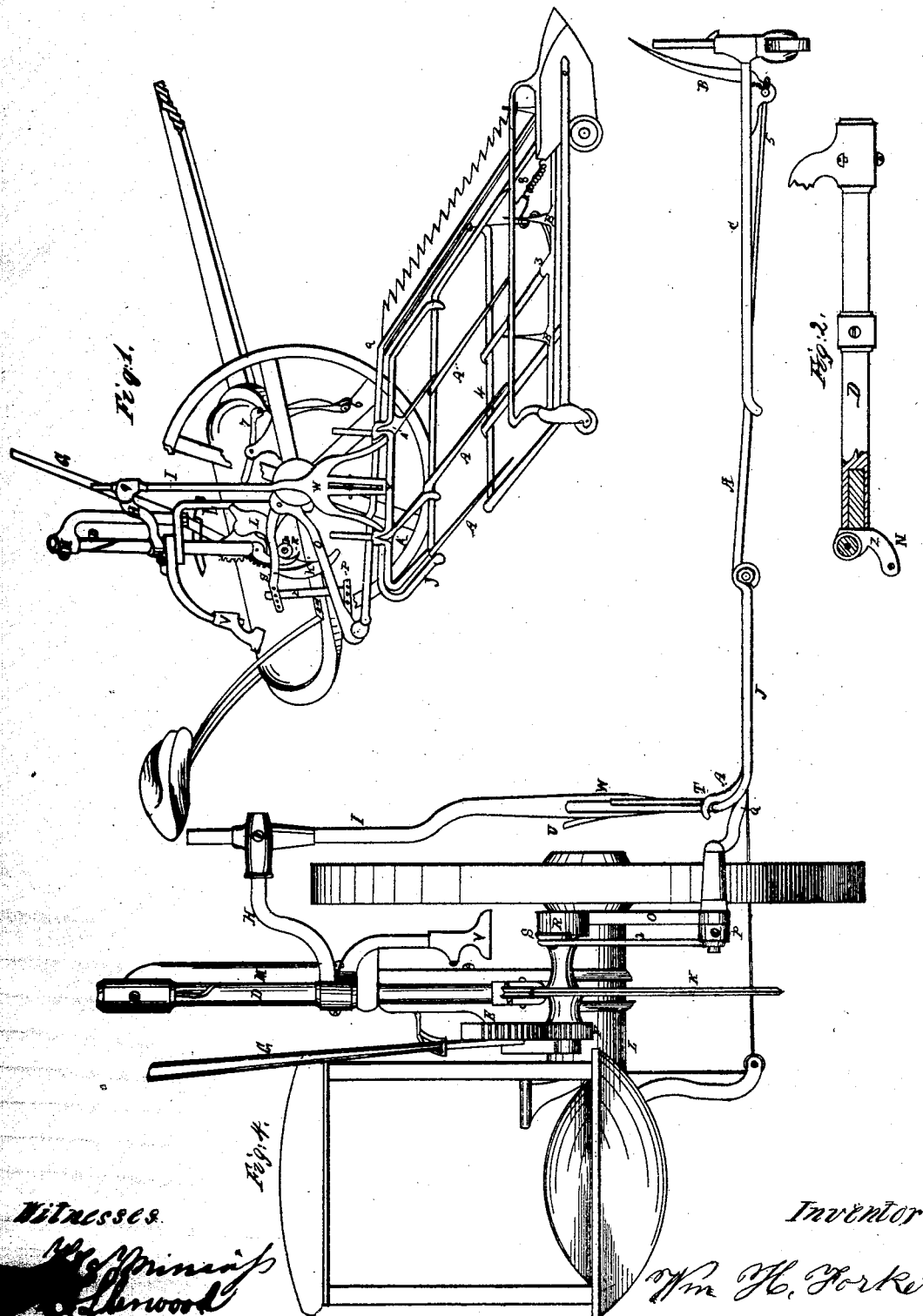

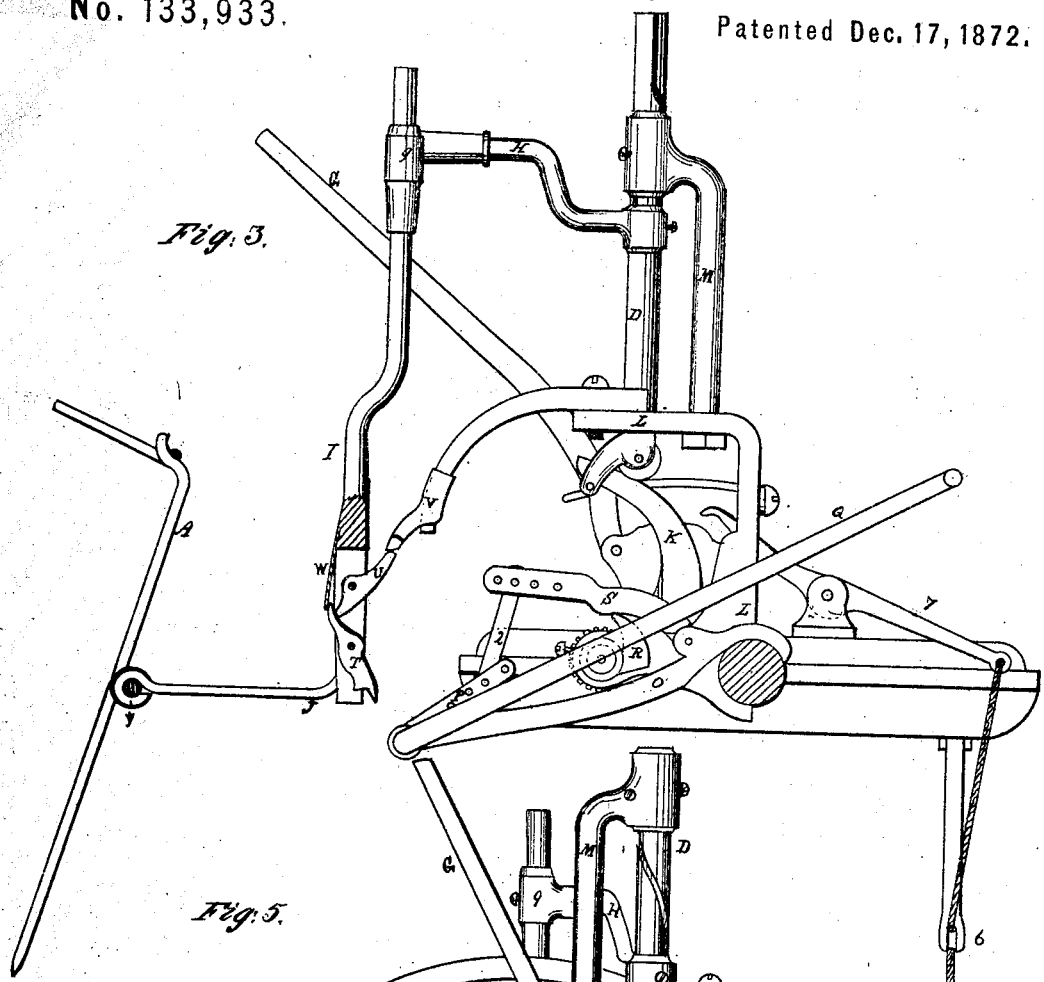
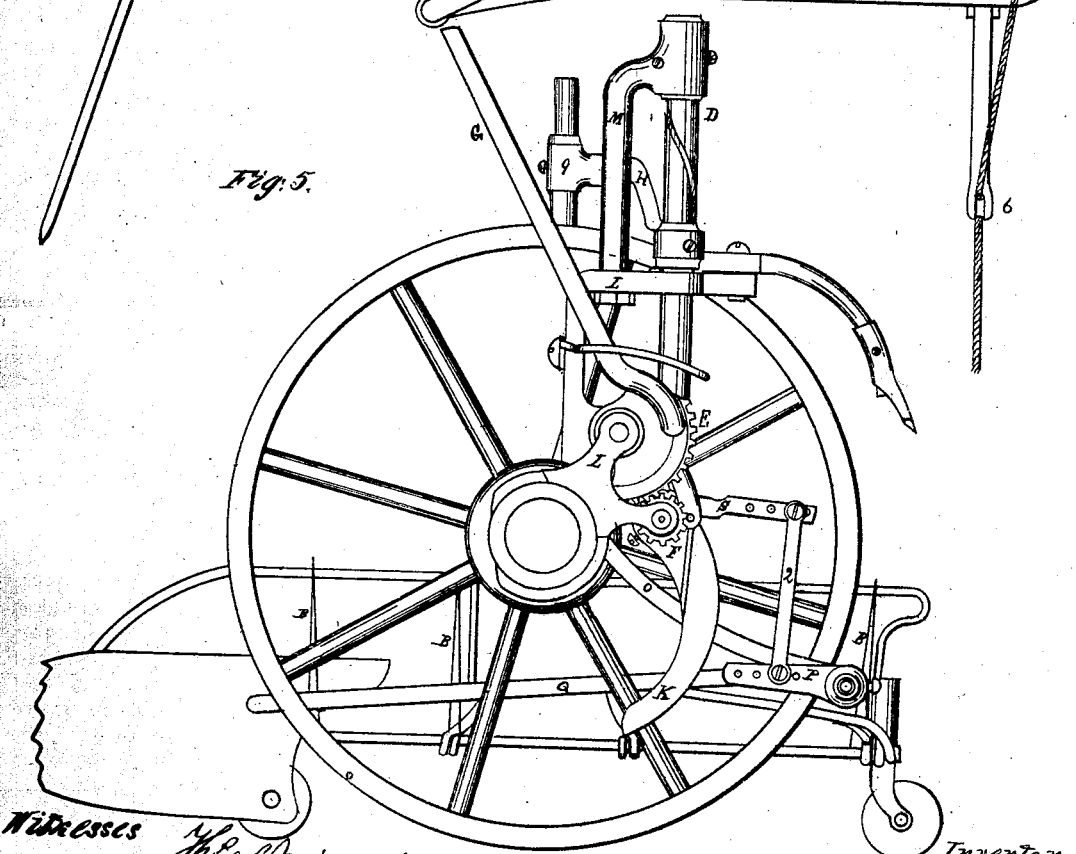

WILLIAM H. FORKER, OF MEADVILLE, PENNSYLVANIA.

IMPROVEMENT IN HARVESTER-DROPPERS.

Specification forming part of Letters Patent No. 133,933, dated December 17, 1872.

*To all whom it may concern:*

Be it known that I, WILLIAM H. FORKER, of the city of Meadville, in the county of Crawford and State of Pennsylvania, have invented an Improved Method of Delivering Grain from the Platform of a Reaper, of which the following is a specification:

My invention consists in first raising the cut-off bar, then, by a sliding rake, drawing the grain from the outer side of the platform onto a dumping-fork, which, being swung to the rear, is dumped on the ground out of the way of the next passage of the machine.

In the accompanying drawing, Figure 1 is a perspective view with the wheel partly cut away to more fully show the working parts. Fig. 2 is a detached view of the spirally-grooved shaft D with its caster-foot Z. Fig. 3 is a side view of working parts in the act of dumping. Fig. 4 is a view of the machine from the rear. Fig. 5 is a side view with the axle cut away close to the wheel.

The same letters refer to like parts in all the figures.

To the frame-work of a machine near the right-hand wheel I fix the frame L L with its arms for the attachments for the pinion F, the cog-ended lever E G, standard M, &c. Through the upper part of the standard M, which is bent over for that purpose, and through upper arm of the frame L, where the standard M is fixed, I pass the spirally-grooved shaft D, with set-screws through the collar, at the top of M, which project into the grooves and give direction to D as it moves up or down. The grooves have a twist just quarter round the shaft; but, as the cam R which raises the cut-off is moved by the same lever which lifts D, the grooves are left straight for a sufficient length to allow the cam to have its full throw before the spiral begins to swing the dumping-fork to the rear. On a short horizontal shaft at the extreme back end of the frame L are fixed the pinion F, the long cam K, and the cam R. These are all operated by the cogs in the lever E G. There is a rigid arm, O, extended from the frame L to the rear of the wheel, where it is bent round till it reaches beyond the other side of the wheel. This bent end is made hollow. Through this the rear end of the cut-off bar Q passes, as seen in Figs. 1 and 2, in two positions, and as there seen being operated by the cam R on the lever S lifting the lever P (which is fixed to the cut-off by a set-screw,) by the connection-rod 2, the cut-off being one continuous bar the entire length of the cutter-bar, then bent at right angles till it reaches the rear of the wheel, where it is again bent at right angles and passes through the arm O and is fixed to the lever P.

My platform is in two parts: First, the sliding rake B B, and the dumping-fork A A A A. The rake is made of a bar about forty inches long with three or more teeth or prongs about fifteen inches long projecting upward, which, when at rest, stand at the extreme outer side of the platform. There is a short handle, 3, to the rake, which is made hollow, and one of the rods which sustain the rake in its horizontal movements passes through this hollow handle and gives it steadiness and direction. These rods which sustain the rake run parallel with the cutter-bar about half its length, being rigidly fixed to the bar on wheels, which sustains the outer end of the cutter-bar, and they all have a common bearing at their inner ends on the rod 4. (See Fig. 1.)

To operate the rake there is a lever, 5, articulated to the under side of the cutter-bar, which extends back to and passes through a ring or loop fixed to the under side of the handle 3. (See Fig. 4.) About one-third its length from the bar is fixed a cord, which, passing through two loops at the rear of the cutter-bar, is carried under a pulley, 6, to the lever 7, which is operated by the foot of the driver just as the cut-off is raised and before the fork begins to swing its load to the rear. When the foot of the driver is raised the spring 8 instantly throws the rake back into position and holds it there.

The dumping-fork A A is made in two parts: First, the stem I, which, descending from a point high enough to clear the top of the wheels, spreads out in two prongs, J J, at the level of the platform to the width of the fork, say forty inches, when both prongs are again bent at right angles for about one-third the width of the platform, and on the outer ends of these prongs the fork proper is suspended. (See Figs. 1 and 3.) The tines of the fork are united to a common head and reach a little more than two-thirds the width of the platform. There should be four or more in number, with holes through all of them on a line with ends of the prongs J J when the head is back against the stem I. Now, although the tines are longer from their points to the holes of articulation than from there to the head, yet the head must be the heaviest, so that when relieved of the grain the fork will fall back to its horizontal position for the reception of the grain. To keep the tines in this position there is a short lever, T, with a shoulder at its lower end, which is hung to the lower end of the stem I, and when hanging down straight comes over the head of the tines and prevents them from tipping till the lever is pushed back, which is done by the arm V at the rear of the wheel, which has a wedge-like point, which, when the lever U slides its upper end under, forces the lower end against the upper end of T, and thus relieves the tines to discharge their load. (See Fig. 3.) Then, as soon as the top of U drops below V the spring W throws the levers T and U back into position. The arm H is fixed to the shaft D just below the grooves, and is then bent upward and outward far enough to clear the top of wheel and reach to the right-angled sleeve 9, through which both the arm H and stem I pass and are adjusted and secured by set-screws. The long cam K in its outer form is the quarter of a circle, being tapered from where the shaft passes through it to its end. The swivel or caster at the lower end of the grooved shaft has its pulley bearing directly on the upper curve of K with two short legs that bestride K so as to hold and direct the pulley on its track when the shaft D is revolving on its swivel, (see Z Z, Fig. 4, and the section Fig. 2;) and, to prevent the pulley from being thrown from its track, I make grooves on each side of K, in which the points N N projecting from the legs of Z travel.

*Operation.*

The driver with his right hand takes hold the lever G and draws it toward him, at the same time pressing the lever 7 with his foot. The cut-off is first thrown up by the action of the cam R acting under the lever S, which raises the lever P by the connecting-rod 2, and at the same time the grain is brought from the outer side of the platform on the tines A A A by the rake B B. When the cut-off is fully raised the grooves have passed upward till their spiral parts are acted on by the points or guides in the head of M, and the shaft D is forced round carrying with it the dumping-fork, its attachments, and load, all the time ascending as it comes to the rear, where the wedge V, by its action on the levers U and T, liberates the head of the fork, when its load is at once discharged, (see Fig. 3,) and when the lever is thrown back and the foot withdrawn it resumes the position seen in Fig. 1.

I claim—

1. The spirally-grooved shaft D provided with its caster-foot, in combination with the cam K, as and for the purpose set forth.

2. The combination of the cam R, levers S and P, connection-rod 2, arm O, and rod Q, constructed and operated as and for the purpose specified.

3. The lever E G, pinion F, and cams K and R, in combination with the lever S and shaft D for simultaneously operating the cut-off and dropper, substantially as set forth.

WM. H. FORKER.

Witnesses:
    THOS. S. MINNISS,
    H. L. SHERWOOD.